United States Patent [19]

Scheithauer et al.

[11] Patent Number: 4,624,844

[45] Date of Patent: Nov. 25, 1986

[54] PROCESS FOR PRODUCING AMMONIUM PARATUNGSTATE

[75] Inventors: Richard A. Scheithauer; Clarence D. Vanderpool; Martin B. MacInnis; Michael J. Miller, all of Towanda, Pa.

[73] Assignee: GTE Products Corporation, Stamford, Conn.

[21] Appl. No.: 697,662

[22] Filed: Feb. 4, 1985

[51] Int. Cl.$^4$ .............................................. C01G 41/00
[52] U.S. Cl. ................................................... 423/593
[58] Field of Search ......................................... 423/593

[56] References Cited

U.S. PATENT DOCUMENTS 3,052,516 9/1962 Drobnick et al. ................... 423/593

Primary Examiner—John Doll
Assistant Examiner—Wayne A. Langel
Attorney, Agent, or Firm—Donald R. Castle

[57] ABSTRACT

A process is disclosed for producing ammonium paratungstate which involves adding hexamethylenetetramine to a first solution of ammonium tungstate, adjusting the pH to about 2 with an acid to form a precipitate which contains the major portion of the tungsten and the hexamethylenetetramine and separating the precipitate from the resulting mother liquor. The tungsten hexamethylenetetramine precipitate is then dissolved in aqueous ammonia to form a second ammonium tungstate solution which is then heated at from about 90° C. to about 100° C. to form a precipitate essentially all of which is ammonium paratungstate and a mother liquor which contains essentially all of the hexamethylenetetramine. The ammonium paratungstate precipitate is then separated from the mother liquor.

7 Claims, No Drawings

PROCESS FOR PRODUCING AMMONIUM PARATUNGSTATE

FIELD OF THE INVENTION

This invention relates to a process for producing ammonium paratungstate. More particularly, it relates to a process for producing ammonium paratungstate by precipitation of the ammonium paratungstate from a solution which is formed by dissolving a tungsten hexamethylenetetramine solid in aqueous ammonia.

BACKGROUND OF THE INVENTION

Current processing of tungsten ores and other tungsten bearing materials involves their conversion to sodium tungstate solution, purification, and conversion to ammonium tungstate via liquid ion exchange techniques. Evaporation of the ammonium tungstate solution to a fraction of its initial volume results in the formation of tungsten products such as ammonium metatungstate, tungsten oxide, and tungsten metal. Typically, about 85% of the tungsten contained in the ammonium tungstate solution is recovered as ammonium paratungstate. At present, the other 15% that remains in solution is recycled back to the beginning of the process, that is, the caustic digestion of the material. This is inefficient, time consuming and costly.

A method to either increase the recovery of tungsten from ammonium tungstate as ammonium paratungstate and/or to recover the remainder of the tungsten from the ammonium paratungstate liquors without recycling through the process would be highly desirable and an advancement in the art.

SUMMARY OF THE INVENTION

In accordance with one aspect of this invention, there is provided a process for producing ammonium paratungstate. The process involves adding hexamethylene tetramine to a first solution of ammonium tungstate. Thereafter the pH is adjusted to about 2 with an acid to form a precipitate which contains the major portion of the tungsten and the hexamethylene tetramine. The precipitate is separated from the resulting mother liquor. The tungsten hexamethylene tetramine precipitate is then dissolved in aqueous ammonia to form a second ammonium tungstate solution which is then heated at from about 90° C. to about 95° C. to form a precipitate and a mother liquor. The precipitate is essentially ammonium paratungstate and the mother liquor contains essentially all of the hexamethylenetramine. The ammonium paratungstate precipitate is then separated from the mother liquor.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

This invention relates to a process for producing ammonium paratungstate by precipitation of the ammonium paratungstate from a solution which is formed by dissolving a tunsten hexamethylene tetramine solid in aqueous ammonia.

Hexamethylenetetramine is first added to a first solution of ammonium tungstate. This ammonium tungstate solution can be any ammonium tungstate solution. Generally, the tungsten levels can vary from about 5 to about 200 grams per liter.

Hexamethylenetetramine is added in the mole ratio of from about 0.5 to about 2.0 moles per mole of tungsten with from about 0.5 to about 1.0 moles per mole of tungsten being preferred.

The pH of the resulting hexamethylenetetramine treated ammonium tungstate solution is then adjusted to from about 0.5 to about 2.0 with from about 1.5 to about 2.5 being preferred, with an acid, preferably sulfuric acid. It is preferred that the pH adjustment be carried out at a temperature no higher than about 20° C.

Decomposition of the tungsten hexamethylenetetramine compound can occur at temperatures in excess of 20° C.

The pH adjustment results in the formation of a first precipitate of high purity which contains the major portion of the tungsten, generally at least about 99% by weight of the total tungsten and essentially all of the hexamethylenetetramine and a first mother liquor which contains essentially no tungsten.

The first precipitate is then separated from the first mother liquor by any standard technique such as filtration, decantation and the like.

The first precipitate is then dissolved in aqueous ammonia or ammonium hydroxide to form a second ammonium tungstate tungstate solution containing hexamethylenetetramine. To obtain the desired ammonium paratungstate, this second ammonium tungstate solution is heated at from about 90° C. to about 100° C. with from about 90° C. to about 95° C. being preferred. As a result, the solution is reduced to a fraction generally about 25% of its initial volume and a second precipitate essentially all of which is highly pure ammonium paratungstate forms. Essentially all of the hexamethylenetetramine remains with the resulting second mother liquor.

The second precipitate of ammonium paratungstate contains about 90% of the tungsten which was in the starting ammonium tungstate solution.

The second precipitate is then separated from the second mother liquor by any standard technique such as filtration.

The second mother liquor which contains essentially all of the hexamethylenetetramine can be recycled and added to a first ammonium tungstate solution as a source of hexamethylenetetramine.

By the above process, essentially all of the tungsten can be recovered by precipitation with hexamethylenetetramine and from this point can be precipitated as ammonium paratungsate from an ammoniacal solution. If any tungsten remains in the ammonium paratungstate mother liquor, that is, the second mother liquor, it can be recycled.

The precipitation of tungsten from ammonium tungstate with hexamethylenetetramine can be used in conjunction with other methods to recover ammonium paratungstate, the result being a recovery of essentially all of the tungsten as ammonium paratungstate which is of high purity. For example, hexamethylenetetramine is added to an ammonium tungstate solution as described earlier. The resulting solution is then heated at from about 90° to about 100° C. and the volume reduced to a fraction, preferably about 25% of its initial value. As a result, a precipitate of ammonium paratungstate of high purity is formed representing up to about 95% by weight of the initial tungsten. The mother liquor containing the remaining tungsten and the hexamethylenetetramine is then pH adjusted as described previously to precipitate essentially all of the remaining tungsten and the hexamethylenetetramine. Aqueous ammonia or ammonium hydroxide is then added to this precipitate to dissolve it. Essentially all of the tungsten contained therein is then precipitated as pure ammonium paratungstate and the resulting mother liquor containing the hexamethylenetetramine can be recycled as a source of hexamethylenetetramine as describe previously.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing ammonium paratungstate, said process comprising:
   (a) adding hexamethylenetetramine to a first ammonium tungstate solution;
   (b) adjusting the pH of the resulting hexamethylenetetramine treated ammonium tungstate solution to about 2 with an acid to form a first precipitate which contains the major portion of the tungsten and the hexamethylenetetramine and a first mother liquor;
   (c) separating said first precipitate from said first mother liquor;
   (d) dissolving said first precipitate in aqueous ammonia to form a second ammonium tungstate solution containing hexamethylenetetramine;
   (e) heating said second ammonium tungstate solution at from about 90° C. to about 100° C. to form a second precipitate essentially all of which is ammonium paratungstate and a second mother liquor which contains essentially all of the hexamethylenetetramine; and
   (f) separating said second precipitate from said second mother liquor.

2. A process according to claim 1 wherein the mole ratio of hexamethylenetetramine added to the tungsten in the first ammonium tungstate solution is from about 0.5 to about 1.0 to 1.

3. A process according to claim 1 wherein the acid is sulfuric acid.

4. A process according to claim 1 wherein the pH is adjusted at a temperature of no greater than about 20° C.

5. A process according to claim 1 wherein at least about 99% by weight of the tungsten in the first ammonium tungstate solution is recovered in the first precipitate.

6. A process according to claim 1 wherein about 90% of the tungsten in the first ammonium tungstate solution is recovered in the second precipitate as ammonium paratungstate.

7. A process according to claim 1 wherein the second mother liquor is added to said first ammonium tungstate solution as the source of hexamethylenetetramine.

* * * * *

UNITED STATES PATENT AND TRADEMARK OFFICE

Certificate

Patent No. 4,624,844                                          Patented: November 25, 1986

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is:

> Richard A. Scheithauer
> Clarence D. Vancerpool
> Martin B. MacInnis
> Michael J. Miller
> Kenneth T. Reilly Signed and Sealed this 1st Day of August 1989.

> John Doll
> *Supervisory Primary Examiner*
> *Art Unit 113*